United States Patent [19]
Armstrong et al.

[11] 3,909,314
[45] Sept. 30, 1975

[54] METHOD FOR INDUCTIVELY HEATING AND QUENCH HARDENING SURFACES ON A CRANKSHAFT

[75] Inventors: Robert G. Armstrong, Chardon; George C. Nebesar, Parma, both of Ohio

[73] Assignee: Park-Ohio Industries, Inc., Cleveland, Ohio

[22] Filed: Sept. 19, 1974

[21] Appl. No.: 507,407

Related U.S. Application Data

[62] Division of Ser. No. 412,277, Nov. 2, 1973, Pat. No. 3,854,707.

[52] U.S. Cl. ............... 148/146; 148/150; 148/153
[51] Int. Cl.² .......................................... C21D 1/18
[58] Field of Search .......... 148/150, 153, 146, 152, 148/145

[56] References Cited
UNITED STATES PATENTS
3,761,325  9/1973  Balzer .............................. 148/153

*Primary Examiner*—R. Dean
*Attorney, Agent, or Firm*—Meyer, Tilberry & Body

[57] ABSTRACT

An apparatus and method for inductively heating and quench hardening bearing surfaces on a crankshaft having a central axis, the apparatus comprises a shuttle extending along a given longitudinal path and having longitudinally spaced crankshaft receiving nest means for supporting the crankshaft with its central axis extending along the path, means for moving the shuttle to locate one of the nest means at a selected position, and a carriage mounted at the selected position and pivoted about a carriage axis generally parallel to the longitudinal path. The carriage is movable between a loading position adjacent the shuttle, a heating position and a lower quenching position.

1 Claim, 7 Drawing Figures

U.S. Patent Sept. 30,1975 Sheet 4 of 5 3,909,314

METHOD FOR INDUCTIVELY HEATING AND QUENCH HARDENING SURFACES ON A CRANKSHAFT

This is a division of application Ser. No. 412,277 filed Nov. 2, 1973 now U.S. Pat. No. 3,854,707. This invention relates to the art of induction heating and more particularly an apparatus and method for inductively heating and quench hardening the bearing surfaces on a crankshaft.

The invention is particularly applicable for quench hardening the main bearing surfaces and pin bearing surfaces of a crankshaft in a manner to successively heat all bearing surfaces of the crankshaft, and it will be described with particular reference thereto; however, it is appreciated that the invention has broader applications and may be used for inductively heating and then quench hardening only selected bearing surfaces on the crankshaft. As is well known in the induction heating art, the main bearings and pin bearings for a crankshaft must be hardened to improve their wear characteristics. This is generally done by inductively heating the surfaces and then quench hardening them either by a spray, a dunk quench or a combination of the two. A large number of machines have been developed for performing this operation. In accordance with normal practice, a crankshaft is directed to one machine for heating and quench hardening selected bearing surfaces. Thereafter, the crankshaft is conveyed to another machine for heating and quench hardening other surfaces. This is repeated until all the surfaces have been quench hardened. When the production rate is relatively low, a single machine can be used by first heating and quench hardening one set of surfaces and then changing the machine to heat and quench harden other surfaces. In both of these systems, one of the difficult problems is the loading and unloading of the crankshaft into the heating and quenching apparatus. Generally, control is lost over the crankshaft between the separate machines or between the separate heating operations. Consequently, between the separate machines or heating operations, the crankshaft must be again oriented and positioned before being loaded into the machine, either manually or mechanically. This requires a substantial amount of workpiece handling and increases the cost of the processing operations. The present invention relates to an apparatus and method which can perform the same function as prior apparatus but without losing control over the crankshaft between successive processing of the crankshaft.

In accordance with the present invention, there is provided an apparatus for inductively heating and quench hardening bearing surfaces on a crankshaft having a central axis. This apparatus comprises a conveyor means for conveying a crankshaft along a given longitudinal path, wherein the conveyor means includes a crankshaft supporting means for supporting the crankshaft with its central axis extending along the path and means for stopping the supporting means at a selected location. The apparatus further includes a carriage pivotally mounted at the selected location and about a carriage axis generally parallel to and offset laterally from the longitudinal path. This carriage comprises locating means for locating a crankshaft for rotation about its central axis on a work axis generally parallel to the path and means for rotating the crankshaft in this locating means and about the work axis. The carriage is selectively pivoted about the carriage axis between a first angular position with the work axis at the conveyor and generally coinciding with the path, a second angular position, and a third angular position below the second position. In accordance with the invention, means on the carriage are provided for selectively gripping a crankshaft in one of the supporting means by the locating means on the carriage. In accordance with this invention, the surfaces can be heated when the carriage is in the second angular position and quench hardened when the carriage is in the third angular position.

In accordance with another aspect of the present invention, there is provided a method for inductively heating and quench hardening bearing surfaces of a crankshaft having a central axis. This method comprises the steps of providing at a selected location a carriage pivotally mounted about the carriage axis between first, second and third angular positions; providing locating means on the carriage for selectively gripping or releasing a crankshaft; moving a crankshaft axially along a longitudinal path generally parallel to the carriage axis to the selected location and at the first angular position of the carriage; pivoting the carriage into the first angular position; gripping the crankshaft by the locating means on the carriage; pivoting the carriage into the second angular position; inductively heating at least one of the surfaces while the carriage is in the second angular position and as the crankshaft is rotated about its central axis; pivoting the carriage into the third angular position; quench hardening the heated surface while the carriage is in the third angular position and while the crankshaft is rotated about its central axis; pivoting the carriage into the first angular position where the central axis is aligned with the longitudinal path; releasing the crankshaft from the locating means; pivoting the carriage away from the first position; and moving the crankshaft axially along the path from the selected position.

The primary object of the present invention is the provision of a method and apparatus for inductively heating and then quench hardening bearing surfaces on a crandshaft, which method and apparatus maintains control of the crankshaft between successive combined heating and quench hardening operations.

Yet another object of the present invention is the provision of a method and apparatus for inductively heating and then quench hardening bearing surfaces on a crankshaft, which method and apparatus move the crankshaft in a direction generally parallel to the axis used in successively heating and quench hardening the surfaces.

Another object of the present invention is the provision of a method and apparatus for inductively heating and then quench hardening bearing surfaces on a crankshaft, which method and apparatus results in a high production rate.

Yet another object of the present invention is the provision of a method and apparatus as defined above which use the location of the crankshaft on a conveyor as the locating arrangement for successive heating and quench hardening operations.

These and other objects and advantages will become apparent from the following description taken together with the accompanying drawings in which.

Figure 1:
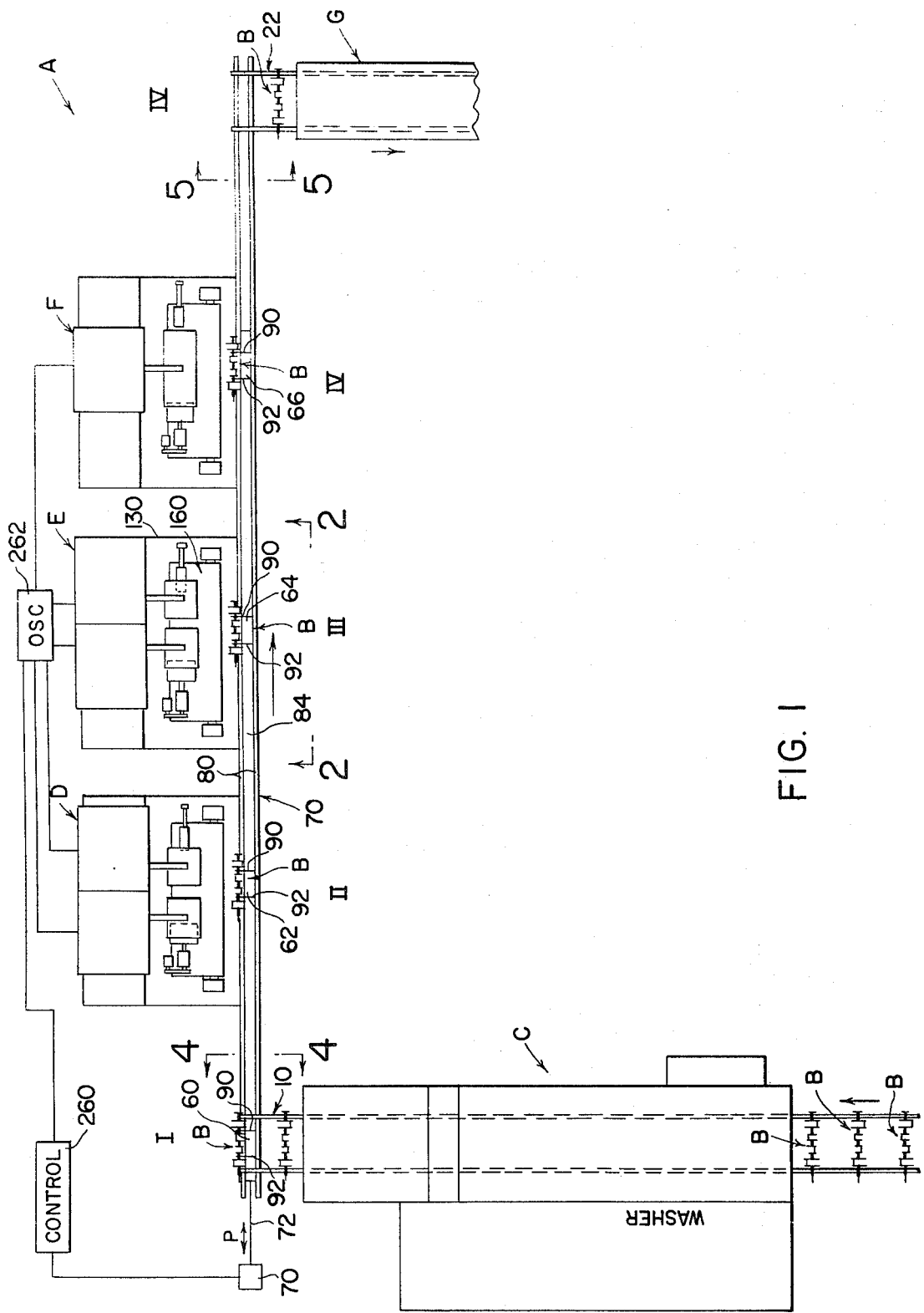
FIG. 1 is a top plan view illustrating, schematically, the preferred embodiment of the present invention.

Referring now to the drawings wherein the showings are for the purpose of illustrating a preferred embodiment of the invention only and not for the purpose of limiting same, FIG. 1 shows a system A for processing a series of crankshaft B, and primarily for the purpose of inductively heating and quench hardening axially spaced bearing surfaces on the crankshaft. In accordance with the illustrated embodiment shown in FIG. 1, a standard washer C receives the crankshaft B riding along a conveyor 10, best shown in FIG. 4. After being removed from the washer, the crankshafts B are deposited onto a receprocating shuttle 20 extending in front of three induction heating and quench hardening machines D, E, and F. These machines process each of the crankshafts by removing the crankshafts from the reciprocating shuttle 20, processing the same and then redepositing the crankshafts onto the shuttle. Shuttle 20 extends to an unloading conveyor 22, best shown in FIG. 5, where the crankshafts are removed and conveyed through a drawing furnace G. In summary, the system A includes a conveying system for transporting a series of crankshafts B through a washer C, through the processing machines D, E and F to a furnace G. The present invention relates to the reciprocating shuttle 20 and the induction heating and quench hardening machines D, E, F, which are substantially the same in construction and operation.

Figure 2:
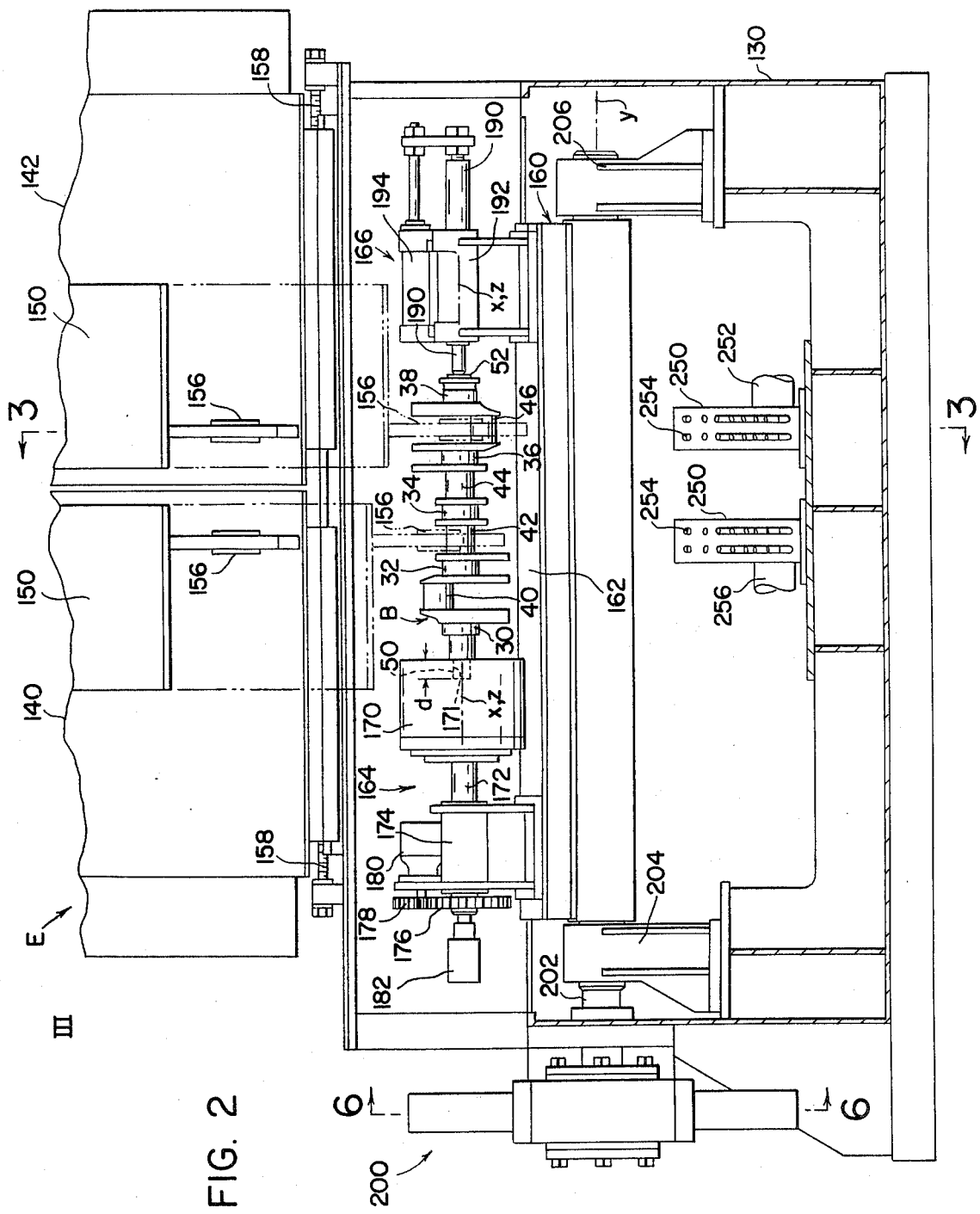
FIG. 2 is an enlarged front elevational view taken generally along line 2—2 of FIG. 1.

Referring now more particularly to FIg. 2, the crankshaft B is a standard crankshaft having axially spaced main bearings 30, 32, 34, 36 and 38 and axially spaced, radially offset pin bearings 40, 42, 44 and 46. One end of the crankshaft includes a stub shaft 50 and the other end 52 includes the standard center bore for receiving a center, as will be explained later. Crankshaft B includes a central axis $x$ which is concentric with the main bearings and around which the pin bearings orbit during rotation of the crankshaft about its central axis $x$. In accordance with the illustrated embodiment of the invention, machine D inductively heats and quench hardens two of the pin bearings, machine E inductively heats and quench hardens the other two pin bearings, and machine F inductively heats and quench hardens all the main bearings. Consequently, by being processed with the three machines, all of the bearings are inductively heated and quench hardened.

Referring now to the shuttle 20, the shuttle extends in a straight longitudinal path P and includes four longitudinally spaced crankshaft nest means 60, 62, 64 and 66. The shuttle is reciprocated by any appropriate reciprocating drive means 70 which is schematically illustrated in FIG. 1 and includes a link 72 for driving shuttle 20 in a reciprocal fashion along path P. The shuttle includes five separate positions designated I, II, III, IV, and V. Position I is the loading position adjacent the washer conveyor 10. Position II is located directly opposite machine D. In a like manner, positions III, IV are positioned directly opposite to and aligned with machines E, F, respectively. The last position, position V is directly opposite the furnace conveyor 22. In the first, or retracted position of shuttle 20, as shown in FIG. 1, nest means 60, 62, 64, 66 are at positions I, II, III, IV, respectively. In the other position of the shuttle, nest means 60 is shifted to position II. Consequently, nest means 62, 64 and 66 are at positions III, IV and V, respectively. Shuttle 20 can take a variety of forms; however, in accordance with the illustrated embodiment, a pair of upper rails 80 coact with a pair of lower rails 82 to provide a guide for the shuttle bar 84 supported on oppositely extending rollers 86.

Figure 4:
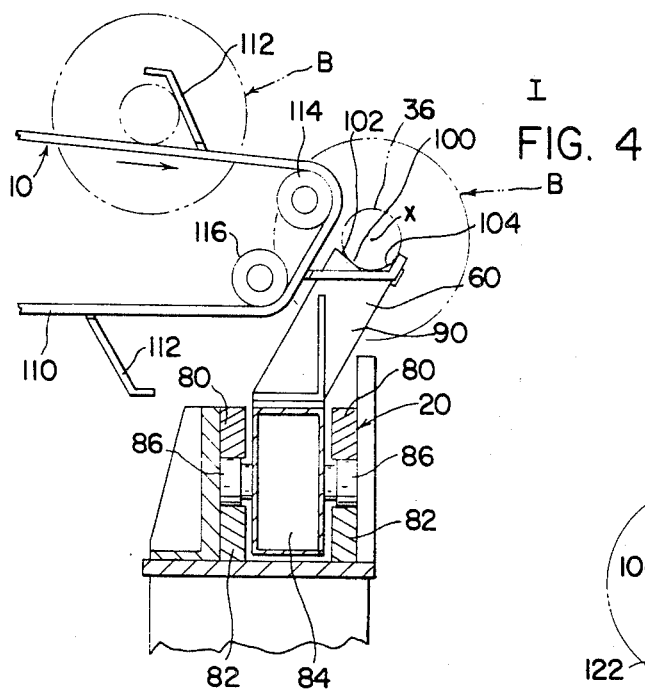
FIG. 4 is an enlarged view taken generally along line 4—4 of FIG. 1.
Figure 5:
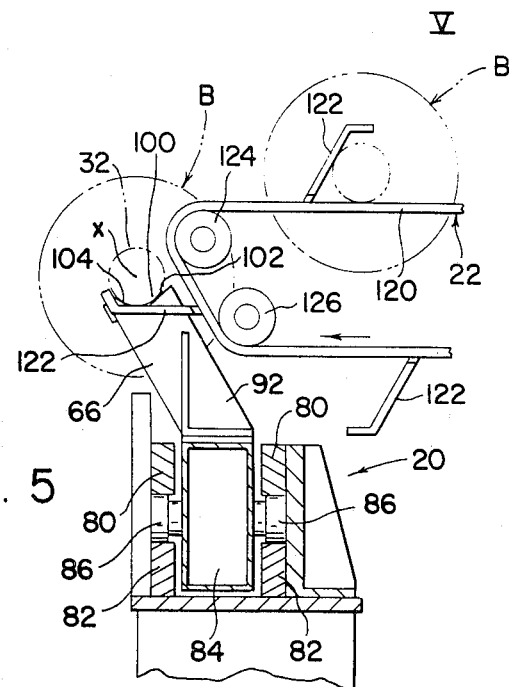
FIG. 5 is an enlarged view taken generally along line 5—5 of FIG. 1.

The structure of the nest means can be varied; however, in accordance with the illustrated embodiment of the invention, these nest means are formed by a pair of longitudinally spaced, angled stands 90, 92, best shown in FIGS. 4 and 5 for engaging two of the main bearing surfaces of the crankshaft. These stands include an upper V-shaped support means defined by an outer surface 102 and an inner surface 104. Outer surface 102 is angled to allow receipt of main bearings 32, 36. In this manner, the central axis of crankshaft B is located by V-shaped support means 100. Inner surface 104 is angled at a position which will allow insertion and removal of the crankshaft from the nest means by a mechanism associated with the machines D, E and F, as will be explained later.

Referring now more particularly to FIG. 4, conveyor 10 includes endless belt 110 having a plurality of spaced guide fingers 112 and entrained around spaced rollers 114, 116. When nest means 60 is empty and in position I, belt 110 is rotated as shown by the arrow in FIG. 4 to deposit a crankshaft onto nest means 60. In a similar manner, conveyor 22, shown in FIG. 5, includes an endless belt 120 and pick-up fingers 122 spaced along the belt. Rollers 124, 126 remove a finished crankshaft B from nest means 66 when this nest means is in position V, as shown in FIG. 1. It is appreciated that other conveyors could be used for loading and unloading crankshafts from the shuttle 20.

Figure 3:
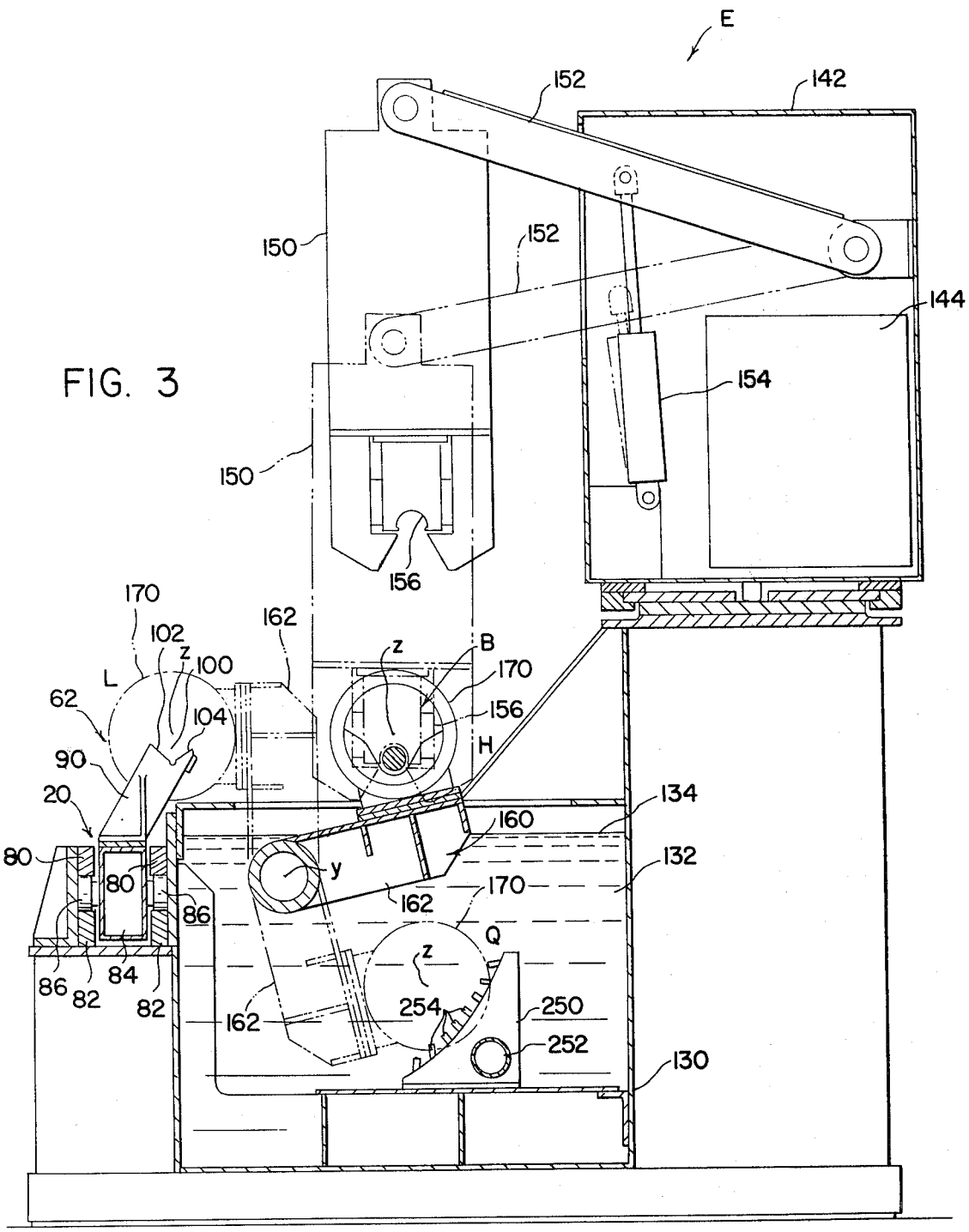
FIG. 3 is a side plan view taken generally along line 3—3 of FIG. 2.

Referring now more particularly to FIGS. 2 and 3, which relate to position III, as shown in FIG. 1, induction heating and quench hardening machine E is illustrated. It is appreciated that the other machines D, F are substantially identical to machine E; therefore, the description of the construction and operation of machine E can be applied equally to the other machines. The other machines E, F inductively heat and quench harden other bearing surfaces on crankshaft B. Machine E includes a base 130 defining a tank 132 filled to a level 134 with a quenching liquid. In accordance with somewhat standard induction heating practice for heating surfaces of a crankshaft, there are provided two transformer housings 140, 142 each including an internal transformer 144. Each of the transformers is connected to an inductor unit 150 supported on a pivoting arm 152 counterbalanced by a cylinder 154. The lower inductor head 156 of the inductor unit 150 can be moved between the solid line and phantom line positions of FIGS. 2 and 3 by an appropriate means, not shown. In the phantom line position, the inductor head 156 of each transformer is in heating relationship with a bearing surface, in this instance pin surfaces 42, 46. As crankshaft B is rotated, the inductor heads 156 orbit with the pins to provide induction heating in accordance with normal induction heating technology.

In accordance with the present invention, machine E includes a carriage 160 pivotally mounted about a carriage axis y, as best shown in FIG. 3. The carriage includes platform 162 for supporting a head stock 164 and tail stock 166. The head and tail stock coact to support a crankshaft B on a work axis z which coincides with the central axis x of the crankshaft being processed by machine E and supported between the head stock and the tail stock. Referring now more particularly to the head stock, a chuck 170 having a gripping recess 161 is rotatably mounted by a shaft 172 extending through journal 174. Gears 176, 178 are driven by motor 180 to rotate the shaft 172 and chuck 170 for the purpose of rotating crankshaft B about its axis x, and the work axis z, during the heating and quenching operations. In accordance with known practice, cylinder 182 is used to actuate chuck 170 to grip stub shaft 50 of crankshaft B for rotation of the crankshaft during the processing thereof. Tail stock 166 includes a center 190 reciprocally mounted in guide 192 and operated by a parallel mounted operating cylinder 194. By actuating cylinder 194, center 190 can be inserted or removed from the center bore within the end 52 of crankshaft B. The crankshaft is released from carriage 160 by actuating cylinder 182 and extending the rod cylinder 194. It can be seen that the stub shaft 50 extends into chuck 170 a distance d. This is illustrated to explain one operating step of the system shown in FIG. 1. Chuck 170 is not movable; therefore, during the loading and unloading steps, the crankshaft B is shifted axially by shuttle 20 along axes x, z to provide clearance of shaft 50 with chuck 170.

Figure 6:
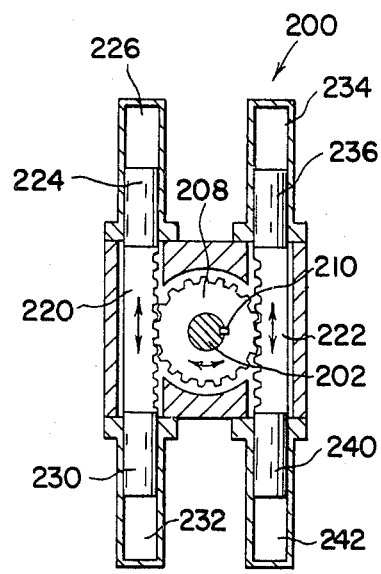
FIG. 6 is a cross-sectional view taken generally along line 6—6 of FIG. 2.

As shown in FIG. 3, platform 162 is movable into three positions designated L, H and Q. These positions represent the loading and unloading position, heating position, and the quenching position, respectively. A variety of arrangements could be used for rotating, or pivoting, carriage 160 between these three positions. In accordance with the illustrated embodiment, a pivoting mechanism 200, as best shown in FIGS. 2 and 6, is employed. Mechanism 200 includes a drive shaft 202 concentric with carriage axis y and connected to the carriage which is journalled in spaced stands 204, 206. A gear 208 is connected by key 210 with the drive shaft 202. This gear is operated by diametrically spaced racks 220, 222 each terminating in a piston operated by a fluid within a cylinder. To rotate gear 208 in one direction, pistons 224, 240 are driven by pressure within cylinders 226, 242, respectively. To operate gear 208 in the opposite direction, pistons 230, 236 are driven by fluid within cylinders 232, 234, respectively. By controlling the introduction of fluid within these cylinders, carriage 160 can be indexed between the various three positions L, H and Q as shown in FIG. 3.

When in position Q, a crankshaft B is exposed to a quenching unit 250 having an inlet 252 and a plurality of outlet nozzles 254. These units 250, two of which are shown in FIG. 2, are movable into appropriate position for directing a quenching liquid onto the particular bearing surface being heated in position E.

In operation, after a crankshaft B is at position III and supported by nest 62, carriage 30 is indexed to the position L, shown in phantom lines in FIG. 3. At that time, center 190 has been retracted and cylinder 182 has opened the chuck 170. The crankshaft is held in a position about two inches to the right of position shown in FIG. 2. Consequently, shaft 50 clears the chuck 170 when the chuck is moved by platform 162 in the position L shown in FIG. 3. In this position, the work axis z is aligned with the central axis x of the crankshaft on nest means 62. Consequently, by shifting the shuttle 20 to the left, as shown in FIG. 2, shaft 50 is fed directly into chuck 170. Thereafter, center 190 is moved to the left by cylinder 194 to grip and rotatably mount crankshaft B on work axis z. Thereafter, carriage 160 is moved into the solid line position H shown in FIG. 3. Inductor unit 150 is shifted from its solid line position to its heating position shown in phantom lines. This brings the two inductor units 156 into induction heating relationship with the spaced pin bearings 42, 46. Motor 180 rotates the crankshaft B by chuck 170, which has been closed, thus orbiting the pin bearings. This orbiting action is followed by inductor units 156 in accordance with normal practice. Cylinders 154 counterbalance the movement of the inductor heads to prevent undue pressure being applied onto the surfaces being heated. After the heating operation, arm 152 removes the inductor units 150 from the heating position. Thereafter, the mechanism 200 indexes carriage 160 into the phantom line position Q shown in FIG. 3. The crankshaft is still rotated by motor 180 during the quenching operation. While the crankshaft is being heated and quench hardened, shuttle 20 has been moved to the left bringing an empty nest means 64 to position III opposite machine E. The quench hardened crankshaft from machine E is then deposited on the empty nest 64 by pivoting platform 62 through mechanism 200 into the phantom line position L shown in FIG. 3. After the carriage has been moved into this position, center 190 is retracted, and chuck 170 is released by cylinder 182. This releases the crankshaft for support by the angled stands 90, 92. Shuttle 20 then moves to the right approximately two inches. This clears shaft 50 from chuck 170. Then, carriage 160 is moved, while empty, into the heating position H, as shown in FIG. 3. After this has been done, the shuttle can be moved to the right taking the processed crankshaft from machine E to machine F for processing. At this same time, the workpiece from machine F is shifted to position V for removal by conveyor 22. Consequently, with the shuttle in the left position shown in FIG. 1, the workpiece is loaded onto nest means 60 at position I. Machines D, E and F each deposit a processed crankshaft on nest means 62, 64 and 66. Thereafter, shuttle 20 is moved to the right which allows removal of a crankshaft from the nest means 66 at position V by conveyor 22. At this time, nest means 60, 62, and 64 are opposite machines D, E and F. The loading operation then takes place as previously described.

Figure 7:
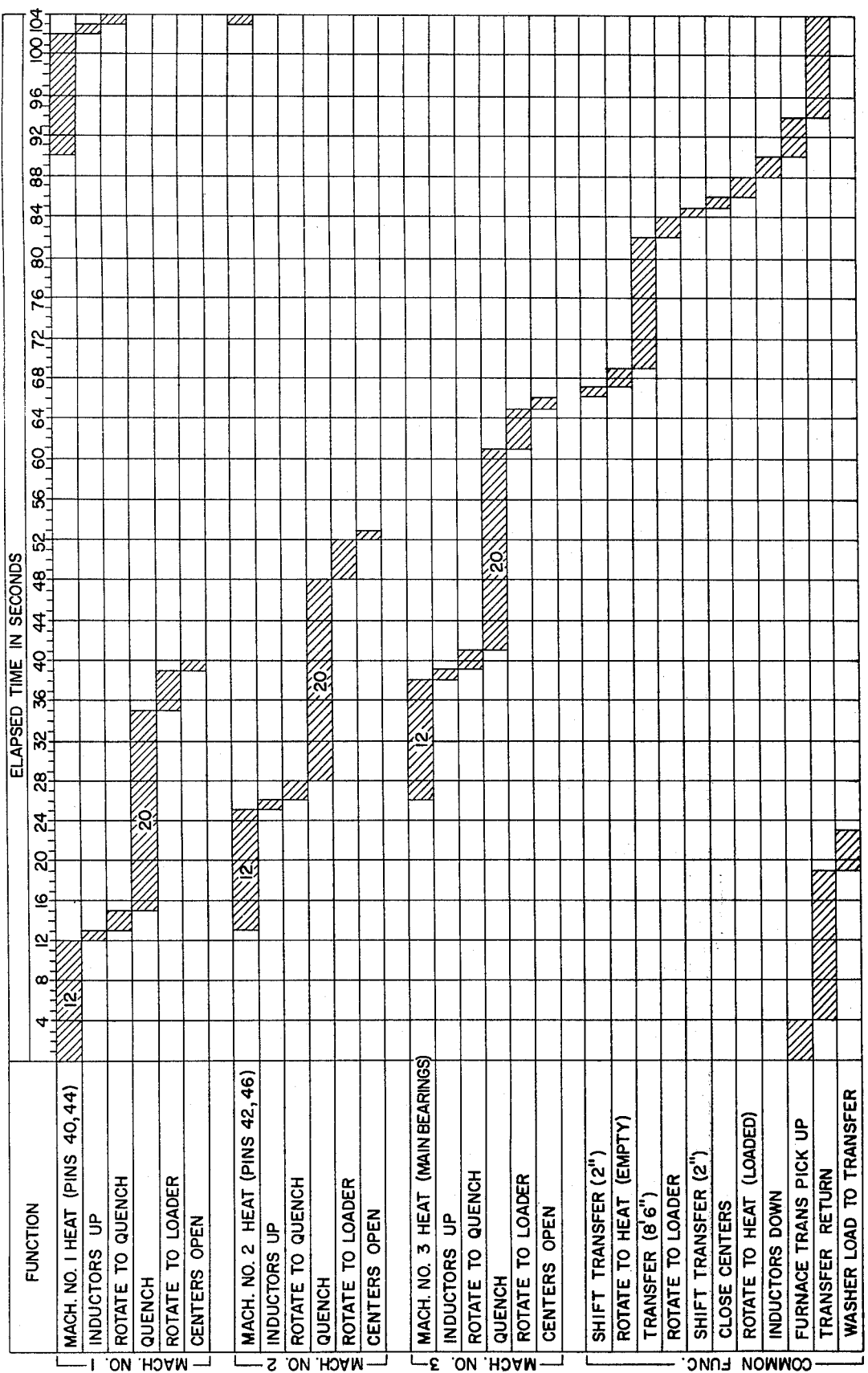
FIG. 7 is a chart illustrating the operating steps utilized in the preferred embodiment of the present invention.

The operating steps, as explained above, are outlined in chart form in FIG. 7. Any appropriate arrangement could be provided for controlling the various steps as previously mentioned and described. FIG. 1 shows a schematic control unit 260 which controls the shuttle 20 by device 70 and oscillator 262 which controls the heating operation of the various transformers within machines D, E and F. Of course, various control devices are well in the induction heating art for practicing the particular steps illustrated and described in connection with the preferred embodiment of the present invention.

Having thus describe our invention; We claim:

1. A method for inductively heating and quench hardening bearing surfaces on a crankshaft having a central axis, said method comprising the steps of:
   a. providing at a selected location a carriage pivoted about a carriage axis between first, second and third angular positions;
   b. providing locating means on said carriage for selectively gripping or releasing a crankshaft;
   c. moving a crankshaft axially along a longitudinal path generally parallel to said carriage axis to said selected location and at said first angular position;
   d. pivoting said carriage into said first angular position;
   e. gripping said crankshaft by said locating means on said carriage;
   f. pivoting said carriage into said second angular position;
   g. inductively heating at least one of said surfaces while said carriage is in said second angular position and while said crankshaft is rotated about its central axis;
   h. pivoting said carriage into said third angular position;
   i. quench hardening said at least one surface while said carriage is in said third angular position and while said crankshaft is rotated about its central axis;
   j. pivoting said carriage into said first angular position where said central axis is aligned with said path;
   k. releasing said crankshaft from said locating means;
   l. pivoting said carriage away from said first position; and,
   moving said crankshaft axially along said path from said selected location.

* * * * *